United States Patent [19]

Suzuki et al.

[11] Patent Number: 5,732,363
[45] Date of Patent: Mar. 24, 1998

[54] SOLIDIFYING MATERIAL FOR RADIOACTIVE WASTES, PROCESS FOR SOLIDIFYING RADIOACTIVE WASTES AND SOLIDIFIED PRODUCT

[75] Inventors: Kazunori Suzuki; Shigeru Mihara, both of Oarai; Takuro Yagi, Yokohama; Yoshimitsu Karasawa, Fujioka; Koichi Ikeda, Takasaki; Yasuo Kuroda, Matsuida, all of Japan

[73] Assignees: JGC Corporation; Nippon Kayaku Kabushiki Kaisha, both of Tokyo, Japan

[21] Appl. No.: 547,576

[22] Filed: Oct. 24, 1995

[51] Int. Cl.$^6$ .................................................. G21F 9/00
[52] U.S. Cl. .......................... 588/4; 588/252; 588/255; 106/711; 106/790
[58] Field of Search ........................ 588/3, 4, 9, 242, 588/255; 106/711, 790

[56] References Cited

U.S. PATENT DOCUMENTS

| 2,614,634 | 10/1952 | Lea et al. | 106/93 |
|---|---|---|---|
| 2,822,873 | 2/1958 | Harmsen et al. | |
| 3,972,972 | 8/1976 | Yano et al. | |
| 4,483,789 | 11/1984 | Kunze et al. | |
| 5,026,215 | 6/1991 | Clarke | 405/266 |
| 5,341,882 | 8/1994 | Hale | 166/293 |
| 5,342,445 | 8/1994 | Kiyomoto et al. | 106/789 |
| 5,411,092 | 5/1995 | Cowan | 166/293 |
| 5,466,289 | 11/1995 | Yonezawa et al. | 106/809 |
| 5,558,708 | 9/1996 | Tohansen, Jr. et al. | 106/712 |

FOREIGN PATENT DOCUMENTS

| 0 037 324 | of 1981 | European Pat. Off. |
| 61-215999 | 9/1986 | Japan. |
| 2 065 360 | of 1981 | United Kingdom. |

OTHER PUBLICATIONS

Database WPI, Week 9332, Derwent Publications Ltd., London, G.B.; AN 93-253614 & JP-A-00 172 998 (Hitachi) Abstract Copy of European Search Report dated Feb. 23, 1996.

*Primary Examiner*—Ngoclan Mai
*Attorney, Agent, or Firm*—Nields, Lemack & Dingman

[57] ABSTRACT

There are provided a solidifying material used for radioactive waste which comprises a latent hydraulic material, an ultra-fine powder substance and a dispersing agent, and a process for the solidification of radioactive wastes which comprises kneading the above solidifying material with a cure stimulating agent, radioactive waste and, as occasion demands, water, and then curing the mixture by aging. Since the solidifying material of the present invention has excellent properties such as large treating capacity, excellent water resistance and large compressive strength, not only temporary storage but also permanent storage of radioactive wastes can be made.

27 Claims, No Drawings

[TECHNICAL FIELD OF THE INVENTION]

This invention relates to a solidifying material used for the solidification of radioactive wastes discharged from nuclear power plants, spent nuclear fuel reprocessing plants or facilities, nuclear power research facilities or the like, to a process for the solidification of radioactive wastes and to a solidified product.

[PRIOR ART]

Radioactive wastes discharged from nuclear power plants and other facilities in various forms including liquid and solid forms have been uniformly solidified by cement solidification, asphalt solidification, plastic solidification and the like means.

In recent years, attempts have been made to realize cement solidification and the like treatment of miscellaneous solid wastes, e.g. metals and concrete, discharged from nuclear power plants.

The generally and widely used cement solidifying method is excellent in durability, but has disadvantages in that its treatment capacity to include and solidify radioactive wastes is small, mixing with wastes raises dust and leaching of wastes from solidified products is relatively large.

Among the aforementioned radioactive wastes, waste water containing sodium sulfate is discharged in most larger amount and generally treated by the cement solidifying method which, however, has a treatment capacity of only 8 to 20% (sodium sulfate/solidified product).

In addition, when the waste is an ion exchange resin or the like, the waste is usually mixed with cement (pretreatment) and then solidified with cement.

In view of the above, great concern has been directed toward the development of a radioactive waste-solidifying mineral based material which has a large treatment capacity, does not require pretreatment, hardly causes leaching and is excellent in durability.

[SUMMARY OF THE INVENTION]

The inventors of the present invention have conducted intensive studies on the method for obtaining solidifying materials free from the problems and found a solidifying material which can resolve the aforementioned problems, thereby accomplishing the present invention.

Accordingly, the present invention provides:

(1) a solidifying material used for radioactive waste which comprises (a) granulated blast furnace slag and/or converter slag, (b) an ultra-fine powder substance and (c) a dispersing agent;

(2) the solidifying material according to the aforementioned item (1) wherein the component (a) has a Blaine specific surface area of 2,000 to 15,000 cm$^2$/g;

(3) the solidifying material according to the aforementioned item (1) or (2) wherein it further comprises (d) a needle mineral powder and/or a fibrous substance;

(4) the solidifying material according to any one of the aforementioned items (1) to (3) wherein the component (b) is at least one substance selected from the group consisting of silica fume, fly ash, silica sand, silicate pigment, clay, talc, kaolin, calcium carbonate, pulverized pottery, pulverized annealed blast furnace slag, titania, zirconia, alumina and aerosil;

(5) the solidifying material according to any one of the aforementioned items (1) to (4) wherein the component (c) is a high polymer having carboxylate groups in the molecule and/or a salt thereof;

(6) the solidifying material according to any one of the aforementioned items (3) to (5) wherein the component (d) is at least one substance selected from the group consisting of wollastonite, sepiolite, chrysotile, amosite, tremolite, rock wool, fly ash fiber, glass fiber, carbon fiber, vinylon fiber, nylon fiber, aramid fiber, polypropylene fiber, acrylic fiber, polyester fiber, pulp, cellulose fiber, steel fiber and alumina fiber;

(7) the solidifying material according to the aforementioned item (6) wherein the component (d) is at least one substance selected from wollastonite, pulp and polypropylene fiber;

(8) the solidifying material according to any one of the aforementioned items (1) to (7) wherein it further comprises (e) a water soluble nitric acid salt;

(9) the solidifying material according to the aforementioned item (8) wherein the component (e) is sodium nitrate;

(10) the solidifying material according to any one of the aforementioned items (1) to (9) wherein it further comprises (f) a thickener;

(11) the solidifying material according to any one of the aforementioned items (1) to (10) wherein it further comprises (g) water and shows fluidity even when one or more days passed after kneading;

(12) the solidifying material according to the aforementioned item (11) wherein viscosity just after kneading is in the range of from 500 to 30,000 cps;

(13) a process for solidifying radioactive wastes which comprises mixing and kneading the solidifying material of any one of the aforementioned items (1) to (12) with (h) a cure stimulating agent, radioactive waste and if necessary water, and subsequently effecting aging and solidification thereof;

(14) the process according to the aforementioned item (13) wherein the component (h) is at least one compound selected from the group consisting of alkali metal hydroxides, carbonates and silicates;

(15) the process according to the aforementioned item (14) wherein the component (h) is at least one compound selected from sodium hydroxide, sodium carbonate, potassium hydroxide, sodium silicate and calcium hydroxide;

(16) the process according to any one of the aforementioned items (13) to (15) wherein the radioactive waste is one of the following radioactive wastes (i) to (vi)
  (i) waste water discharged from BWR electric power plants which contains inorganic salts including sodium sulfate, or a powder obtained as occasion demands by its heat drying and subsequent pulverization,
  (ii) waste water discharged from PWR electric power plants which contains inorganic salts including borate, a powder obtained as occasion demands by its heat drying and subsequent pulverization, a cake obtained by pretreating the borate-containing waste water, or a powder obtained as occasion demands by heat drying and subsequent pulverization of the cake,
  (iii) a granular or powdery ion exchange resin discharged from nuclear power plants, (iv) burned ash formed after combustion of combustible waste discharged from nuclear power plants, (v) waste water discharged from spent nuclear fuel reprocessing plants or facilities which contains inorganic salts including sodium nitrate and/or calcium phosphate, or a powder obtained as occasion demands by its heat drying and subsequent pulverization, and (vi) burned ash formed after combustion of combustible waste discharged from spent nuclear fuel reprocessing plants or facilities;

(17) a process for solidifying radioactive wastes which comprises putting the following radioactive miscellaneous solid waste (vii) or (viii) in a container, packing the container with a mixture composed of the solidifying material of any one of the aforementioned items (1) to (12), (h) a cure stimulating agent and if necessary water (to be referred to as mixture (A) hereinafter) with vibration as occasion demands, and subsequently effecting aging and solidification thereof at room temperature or with heating:

(vii) miscellaneous solid waste discharged from nuclear power plants, or (viii) miscellaneous solid waste discharged from spent nuclear fuel reprocessing plants or facilities;

(18) the process according to the aforementioned item (16) wherein aging and solidification are effected at room temperature or with heating after mixing the radioactive waste of the aforementioned item (16) in the form of powder with the aforementioned mixture (A) and if necessary adding water thereto;

(19) the process according to the aforementioned item (16) wherein aging and solidification are effected at room temperature or with heating after mixing and kneading the radioactive waste of the aforementioned item (16) in the form of waste water with the aforementioned mixture (A) or after increasing concentration of solid contents in the waste water and subsequently mixing and kneading with the mixture (A);

(20) the process according to any one of the aforementioned items (16) to (19) wherein the radioactive waste is mixed or kneaded with the mixture (A) and then aging and solidification are effected at room temperature as such or after covering it to prevent evaporation of water; and

(21) a solidified product obtained by the process of any one of the aforementioned items (13) to (20).

[BEST MODE FOR CARRYING OUT THE INVENTION]

The following describes the present invention in detail.

In the present invention, granulated blast furnace slag and converter slag are used alone or as a mixture thereof, of which granulated blast furnace slag is preferred. The granulated blast furnace slag or converter slag (to be referred in combination to as "latent hydraulic material" hereinafter) may have a Blaine specific surface area of generally 2,000 $cm^2/g$ or more, preferably 3,000 $cm^2/g$ or more, more preferably 4,000 $cm^2/g$ or more, most preferably from 8,000 to 15,000 $cm^2/g$.

The ultra-fine powder substance to be used in the present invention may have an average particle size which is smaller than the average particle size of the latent hydraulic material, preferably smaller by at least one order of magnitude than the average particle size of the latent hydraulic material, more preferably smaller by two orders or more.

Illustratively, the ultra-fine powder substance may have an average particle size of 10 µm or less, preferably from 0.01 to 2 µm.

Illustrative examples of the ultra-fine powder substance include silica fume, fly ash, silica sand, silicate pigment, clay, talc, kaolin, calcium carbonate, pulverized pottery, pulverized annealed blast furnace slag, titania, zirconia, alumina, aerosil and the like, of which silica fume is particularly preferred because of its significant effects in improving fluidity and the like at the time of casting and mechanical strength after hardening.

The ultra-fine powder substance may be used in an amount of generally from 2 to 50 weight parts, preferably from 5 to 25 weight parts, per 100 weight parts of the latent hydraulic material, though it varies depending on the size (particle size) and type of the latent hydraulic material and the type and amount of other various admixtures which may be added as occasion demands.

The dispersing agent to be used in the present invention is preferably a high polymer having carboxylate groups in the molecule and/or a salt thereof, and its illustrative examples include poly(meth)acrylic acid salts, acrylic acid/maleic acid copolymers, acrylic acid/maleic acid/isobutyl vinyl ether copolymers, acrylic acid/itaconic acid/styrene copolymers, acrylic acid/itaconic acid/methacrylic acid/styrene copolymers, maleic anhydride/$C_5$~$C_8$ olefin copolymers and the like. Examples of the salts include alkali metal salts such as lithium salts, sodium salts, potassium salts and the like as well as ammonium salts, amine salts and the like.

The dispersing agent to be used in the present invention may also be a copolymer of (meth)acrylic acid, maleic acid, itaconic acid, styrene, a vinyl ether or the like with a copolymerizable monomer. Illustrative examples of the copolymerizable monomer include hydroxyethyl (meth) acrylate, N-vinyl pyrrolidone, sodium styrenesulfonate, sodium allylsulfonate, sodium methacrylsulfonate, vinyl acetate, methyl acrylate, ethyl acrylate, butyl acrylate, acrylonitrile, methyl methacrylate, acrylamide, methacrylamide, ethylene, propylene, isobutylene and the like.

The dispersing agent may be used in an amount of generally from 0.1 to 10 weight parts, preferably from 0.2 to 7.5 weight parts, more preferably from 0.5 to 5 weight parts, per 100 weight parts in total of the latent hydraulic material and ultra-fine powder substance, though it varies depending for example on the properties of the solidifying material and the type of the radioactive waste.

The dispersing agent to be used in the present invention is not limited to the copolymers described above.

According to the present invention, a condensate of naphthalenesulfonic acid with formalin, a condensate of melaminesulfonic acid with formalin, a condensate of lignin-sulfonic acid and the like known as water reducing agents for cement and concrete may be used by mixing them with the aforementioned dispersing agent. These water reducing agents may be used alone or as a mixture of two or more. When these water reducing agents are used jointly with the aforementioned dispersing agent, it is desirable to use the dispersing agent in an amount of 10% by weight or more of the mixture of the dispersing agent and water reducing agent. Hereinafter, these dispersing agents and water reducing agents are both referred to as dispersants.

These dispersants may have a molecular weight of preferably from 1,000 to less than 200,000, more preferably from 3,000 to 100,000. The molecular weights of 1,000 or less or 200,000 or more would entail poor fluidity of the solidifying material and reduced strength of the solidified product.

These dispersants may be used in an amount of generally from 0.1 to 10 weight parts, preferably from 0.3 to 6 weight parts, more preferably from 0.5 to 3 weight parts, per 100 weight parts in total of the latent hydraulic material and ultra-fine powder substance, though it varies depending for example on the properties of the solidifying material or solidified product and the type of the radioactive waste. When the amount of the dispersants is smaller than 0.1 weight part, kneading of the solidifying material itself or mixing or kneading of the solidifying material with radioactive waste will become difficult and fluidity of the solidifying material will be reduced, depending on the amount of water to be added. The amount larger than 10 weight parts would produce no proportionally greater effect but rather entail economical disadvantage.

The solidifying material of the present invention may contain a needle mineral powder as occasion demands. Illustrative examples of the needle mineral powder include wollastonite, sepiolite, chrysotile, amosite, tremolite and the like, of which wollastonite is preferred in view of the improvement of strength and durability of the solidified product. The needle mineral powder may be used in an amount of generally from 1 to 50 weight parts, preferably from 5 to 30 weight parts, per 100 weight parts of the latent hydraulic material.

The solidifying material of the present invention may contain a fibrous substance as occasion demands. Illustrative examples of the fibrous substance include inorganic fibers such as glass fiber, carbon fiber, rock wool and fly ash fiber, artificial organic fibers such as of vinylon, nylon, aramid, polypropylene, acryl and polyester, natural organic fibers such as pulp and cellulose fiber and metal fibers such as steel fiber and alumina fiber, of which glass fiber and alumina fiber are preferred. These fibrous substances may be used in an amount of generally from 0.1 to 20 weight parts, preferably from 0.2 to 5 weight parts, per 100 weight parts of the latent hydraulic material.

These fibrous substances may have a diameter of generally 1 mm or less, preferably 0.5 mm or less, and a length of generally 3 cm or less, preferably 2 cm or less, more preferably 1 cm or less.

The solidifying material of the present invention may contain a water soluble nitric acid salt as occasion demands. The water soluble nitric acid salt has effects to reduce viscosity of the solidifying material and improve fluidity of the solidifying material. Examples of the water soluble nitric acid salt include nitrates of alkali metals and alkaline earth metals and ammonium nitrate, of which nitrates of alkali metals are preferred and sodium nitrate is particularly preferred.

The water soluble nitric acid salt may be used in an amount of generally from 1 to 40 weight parts, preferably from 2 to 30 weight parts, more preferably from 3 to 25 weight parts, per 100 weight parts of the latent hydraulic material.

As will be described later, it is not necessary to use these water soluble nitric acid salts when the waste to be treated contains sodium nitrate, but these water soluble nitric acid salts may be used when fluidity of the solidifying material or a kneaded product of the solidifying material and the waste is not sufficient enough.

The solidifying material of the present invention may contain a thickener as occasion demands. Illustrative examples of the thickener include hydrophilic polymers having relatively high molecular weight, selected from polyacrylic acid salts, polyacrylamide and acrylic acid/acrylamide copolymer salts; cellulose derivatives such as methyl cellulose, hydroxyethyl cellulose and hydroxypropyl cellulose; and polyethylene oxide, polypropylene oxide, polyvinyl pyrrolidone, polyvinyl alcohol, xanthane gum, curdlan and the like.

The thickener may have a molecular weight of preferably 200,000 or more, more preferably 300,000 or more. The thickener may be used as occasion demands in an amount of from 0.001 to 5 weight parts, preferably from 0.01 to 1 weight part, per 100 weight parts in total of the latent hydraulic material and ultra-fine powder substance.

As occasion demands, various admixtures may be used in the solidifying material of the present invention. Illustrative examples of these admixtures include inorganic fillers, such as pulverized annealed slag, ferrochrome slag, silica, alumina, talc, silica sand, silicate pigment, clay, kaolin, calcium carbonate, pulverized pottery, titania, zirconia and gravel. Also useful are cure delaying agents, such as sugar and glucose, surface treating agents, such as silane coupling agents, pigments and antifoaming agents.

When these various admixtures are used, the inorganic fillers may be used generally in an amount of from 10 to 300 weight parts per 100 weight parts of the latent hydraulic material, and the cure delaying agent, surface treating agent, pigment, antifoaming agent and the like may be used generally in an amount of from 0.1 to 20 weight parts per 100 weight parts of the latent hydraulic material.

The solidifying material of the present invention described in the aforementioned items (1) to (10) is prepared by mixing predetermined amounts of respective components and can be preserved as such in the powder form or after further kneading the powder mixture with a predetermined amount of water as occasion demands.

In that case, in order to effect uniform kneading, it is desirable to mix in advance respective components excluding the dispersants and the thickener to be used as an optional component and then knead the mixture with the dispersants (and the thickener) dissolved in water. Since water is sometimes contained in certain radioactive wastes to be solidified as will be described later, the kneading with water in advance is not necessary in such case.

When the solidifying material of the present invention obtained by the powder mixing method is stored, it does not cause problems commonly found in the case of cement such as insufficient curing when radioactive wastes are solidified, due to progress in curing reaction caused by moisture absorption during storage. Also, the solidifying material of the present invention kneaded with water is easy to store because of its small volume in comparison with the case of storage as the powder form. In consequence, the way of storing the solidifying material, in the powder form or after kneading with water, is optionally decided, taking equipments used for the solidification of radioactive waste, properties of the radioactive waste and the like into consideration.

The water-containing solidifying material of the present invention described in the aforementioned items (11) and (12) has a viscosity of generally from 500 to 30,000 cps just after kneading. When this solidifying material of the present invention is used after 1 week or more or 1 month or more storage, it sometimes shows increased viscosity or a pudding like appearance due to false set, but its initial liquid form can be reproduced by agitation of the content or vibration of the storage vessel. The level of viscosity just after kneading can be maintained at least 1 week or more, generally 3 months or more, by intermittently or continuously stirring the solidifying material of the present invention after kneading.

The water to be used herein may be any of commonly used water such as purified water, tap water and the like and water containing inorganic salts, such as Ca salts and Mg salts, provided that it does not disturb the kneading or the aging and curing of the kneaded product.

The solidification process of the present invention is described below in detail.

The solidifying material of the present invention is used by mixing it with a cure stimulating agent. Various alkaline substances can be used as the cure stimulating agent. Illustrative examples of the cure stimulating agent include alkali metal hydroxides such as sodium hydroxide, potassium hydroxide and lithium hydroxide, alkali metal carbonates such as sodium carbonate, potassium carbonate and lithium carbonate, alkali metal bicarbonates such as sodium bicarbonate, potassium bicarbonate and lithium bicarbonate, alkaline earth metal hydroxides such as calcium hydroxide and magnesium hydroxide, phosphoric acid salts such as sodium pyrophosphate, potassium pyrophosphate, dipotassium hydrogenphosphate, tripotassium phosphate and trisodium phosphate and silicic acid salts such as sodium (meta) silicate and potassium (meta)silicate.

Of these cure stimulating agents, compounds containing alkali metals are preferred, more preferably sodium hydroxide, sodium carbonate, potassium hydroxide or sodium silicate, most preferably sodium hydroxide. When $^{14}C$ is contained in waste, it is desirable to use calcium hydroxide. In that case, calcium hydroxide can be used alone, but it is desirable to use it jointly with at least one compound selected from sodium hydroxide, sodium carbonate, potassium hydroxide and sodium silicate, particularly with sodium hydroxide.

The cure stimulating agent may be used in an amount of generally from 0.3 to 20 weight parts, preferably from 0.5 to 15 weight parts, per 100 weight parts of water to be used, though it varies depending on the basicity (alkaline strength) of the agent, particle size of the latent hydraulic material, types and amounts of various ultra-fine powder substances to be added and types of the wastes to be solidified. Amount of the cure stimulating agent if too small would cause insufficient strength of the solidified product and economic disadvantages such as prolonged solidification time and the like. When radioactive wastes generate a reaction with the cure stimulating agent such as an ion exchange resin or metallic aluminum, the cure stimulating agent is used in such that its amount excluding the portion consumed by the waste becomes the aforementioned amount to be used. As will be described in the following, the amount of water to be used herein is decided by taking the amount of water contained in each waste or absorbed by the waste into consideration.

Though the amount of water to be used varies depending on the types and amounts of the latent hydraulic material and the ultra-fine powder substance, as well as the type and amount of each radioactive waste, and must be decided in such a manner that the kneaded product of the solidifying material and the waste can show proper fluidity and the solidified product can show high strength and high durability, it may be used in an amount of generally from 10 to 200 weight parts, preferably from 15 to 150 weight parts, more preferably from 20 to 100 weight parts, per 100 weight parts in total of the latent hydraulic material and ultra-fine powder substance. When the radioactive waste to be solidified contains water like the case of sodium sulfate waste water, water is used in such an amount that the total of water contained in the radioactive waste and the water to be added becomes the aforementioned amount to be used. When a spent ion exchange resin from which only surface water is removed by e.g. centrifugation is solidified, water contained in the ion exchange resin partially exudes, so that water is used in such an amount that the total of the exuded water and the water to be added becomes the aforementioned amount to be used. Also, when a completely dried ion exchange resin is solidified, the added water is partly absorbed for swelling of the ion exchange resin, so that water is used in such an amount that the amount after exclusion of the absorbed amount becomes the aforementioned amount to be used. In addition, since certain types of waste contain water exceeding the aforementioned range, it is desirable in that case to remove unnecessary water by a known method.

Though not particularly limited to, illustrative examples of the radioactive waste which can be solidified with the solidifying material of the present invention include those which are described in (i) to (viii) of the aforementioned items (16) and (17) discharged from BWR electric power plants, PWR electric power plants, spent nuclear fuel reprocessing plants or facilities and the like.

According to the solidification process of the present invention, the solidifying material and radioactive waste are mixed (kneaded) and then aged and solidified. The solidification process varies depending on the type or shape of each radioactive waste to be solidified. The following describes typical examples of the solidification process.

(A) A case in which the radioactive waste is an aqueous solution containing sodium sulfate or sodium nitrate, a slurry material obtained by concentrating the aqueous solution or burned ash of combustible miscellaneous solids and the like:

Using a mixer, the radioactive waste is mixed with the latent hydraulic material, the ultra-fine powder substance and, as occasion demands, a needle mineral powder and/or fibrous substance and an admixture, and the mixture is further mixed with an aqueous solution containing the dispersants, the cure stimulating agent and, as occasion demands, a water soluble nitric acid salt and then kneaded to prepare a kneaded product having fluidity. Thereafter, this product is packed in a container and subjected to aging and solidification.

(B) A case in which the radioactive waste is a water insoluble solid such as a combustible miscellaneous solid, e.g. paper, cloth or plastics or a miscellaneous solid, e.g. metal or concrete waste, and the waste cannot be mixed (kneaded) uniformly with the solidifying material:

The solidifying material components of the present invention are mixed with water using a mixer, and the thus obtained slurry composition is poured into a container packed with the radioactive waste and then, by adding vibration as occasion demands, the solidifying material is filled up without a gap to effect aging and solidification.

(C) A case in which the radioactive waste is an ion exchange resin or a solid material obtained by evaporating the aqueous solution of (A) above to dryness:

Using a kneading machine, a powder mixture (a) obtained by mixing the latent hydraulic material, the ultra-fine powder substance and, as occasion demands, a needle mineral powder and/or fibrous substance and various water insoluble admixtures is kneaded with an aqueous solution (b) obtained by dissolving the dispersants, the cure stimulating agent and, as occasion demands, a water soluble nitric acid salt and various admixtures such as a water soluble antifoaming agent and the like in water, thereby obtaining a solidifying material (c). The solidifying material (c) is then mixed with a predetermined amount of the radioactive waste and kneaded to obtain a paste like composition (d). In this instance, the steps (a) to (d) are not necessarily in this order, and a good result is obtained in some cases when these steps are carried out at the same time. In order to obtain a uniformly solidified product, it is desirable to use water soluble materials after dissolving them in water as many as possible. Thereafter, the paste like composition (d) is poured into a container to carry out aging and solidification. Even the radioactive waste of (B) above can be applied to this treating method when it can be mixed (kneaded) uniformly with the solidifying material components, and the aqueous solution of (A) above can be used directly as the radioactive waste.

In the cases of (A) to (C), adding order of each radioactive waste and the dispersants is not limited to the above, and the dispersants may be added prior to the addition of the radioactive waste. Also, the step of the mixing and kneading of each radioactive waste with the solidifying material of the present invention may be effected either by adding water to the container (in drum method) or by pouring a previously mixed and kneaded composition containing the radioactive waste and the solidifying material into the container (out drum method). Examples of the container include open drums made of steel and the like.

Radioactive wastes other than the aforementioned wastes (A) to (C) can also be solidified in the same manners as in (A) to (C) above.

The aforementioned ion exchange resins as wastes may be either cation or anion exchange resins and either in powder or granular form. Examples of these resins include a styrene based strongly acidic cation exchange resin, a styrene based strongly basic anion exchange resin, a methacrylic weakly acidic cation exchange resin, an acrylic weakly acidic cation exchange resin, an acrylic weakly basic anion exchange resin and a styrene based weakly basic anion exchange resin.

All of the acid type ion exchange resins, base type ion exchange resins and salt type ion exchange resins can be solidified (acid type ion exchange resin, base type ion exchange resin and salt type ion exchange resin are respectively referred to as acid type, base type and salt type hereinafter). When a salt type is solidified, an acid type or a base type may be converted into a salt type by a salt treatment prior to its kneading with main components of the solidifying material or by adding a salt when an acid type or a base type is kneaded with the solidifying material.

Amount of the solidifying material to be used in the solidification process of the present invention varies depending on each radioactive waste to be treated. That is, in the case of radioactive waste containing sodium sulfate as the main component, the solidifying material is used in such an amount that the amount of sodium sulfate in the mixture of the solidifying material and the radioactive waste becomes generally 10 to 80% by weight, preferably 20 to 60% by weight, on dry basis (the same shall apply hereinafter). In the case of radioactive waste containing sodium nitrate as the main component, the solidifying material is used in such an amount that the amount of sodium nitrate in the mixture of the solidifying material and the radioactive waste becomes generally 20 to 80% by weight, preferably 30 to 70% by weight. In the case of radioactive waste containing an ion exchange resin as the main component, the solidifying material is used in such an amount that the amount of the ion exchange resin in the mixture of the solidifying material and the radioactive waste becomes generally 5 to 30% by weight, preferably 10 to 20% by weight. Also, in the case of other radioactive waste (a miscellaneous solid for example), the solidifying material is used in such an amount that the amount of the radioactive waste in the mixture of the solidifying material and the radioactive waste becomes generally 20 to 90% by weight, preferably 30 to 80% by weight.

Aging to effect the solidification may be carried out at a temperature of generally from room temperature to 100° C., preferably from room temperature to 60° C. It may be carried out under saturated vapor pressure, by heating using a cover to prevent evaporation of moisture or by autoclaving in steam at a temperature of 100° C. or more. Though aging time cannot be specified because of a tendency that higher temperature quickens curing, a solidified product having practical physical properties (compressive strength, water resisting property and the like) can be obtained with about 7 days or more of aging at room temperature or about 12 hours or more of aging at 60° C.

The solidifying material of the present invention can solidify radioactive waste in a large quantity, and the resulting solidified product shows excellent properties such as high strength, excellent water resistance, less dissolution of heavy ions and the like.

[EXAMPLES]

The following examples are provided to further illustrate the present invention. In the examples, the flow value of each kneaded product was measured in accordance with the procedure of JIS R5201.

The compressive strength shown in the examples is a strength (kgf/cm$^2$) obtained by pouring the kneaded product into a cylindrical mold used for cement mortar having a diameter of 5 cm and a height of 10 cm to effect aging and solidification, compressing the thus obtained cylindrical solidified product at a loading rate of 0.2 mm/min using Tensilon (manufactured by Orientec Co.) and then calculating the strength by dividing the load at the time of its breaking by the area of the cross section.

The water resistance in the examples is judged by the area of soaking the cylindrical solidified product in 10 volumes of deionized water and measuring changes in its weight and volume after 1 week to 3 months, simultaneously checking the presence of cracks and the maintenance of original shape. (in the evaluation of water resistance shown in Tables 2 to 9, a solidified product which maintained its original shape even after 1 week to 3 months of the soaking is expressed by "◯".)

Unless otherwise noted, part or % is on the weight basis.

Also, the mixing ratio of ion exchange resin is calculated by the following formula.

Mixing ratio (%)=(dry weight (g) of added ion exchange resin)/ (weight of solidified product (g))×100

Example 1

A planetary mixer (ACM-5, manufactured by Aicohsha Co.) was charged with 90 parts of granulated blast furnace slag (Esment Super 40P, manufactured by Nippon Steel Co.) having a Blaine specific surface area of 4,000 cm$^2$/g and 10 parts of silica fume (manufactured by Japan Metals & Chemicals Co.). Next, an aqueous solution composed of 1 part of an acrylic acid/maleic acid copolymer (9:1) sodium salt having a weight average molecular weight of 35,000 (measured by GPC method, sodium polystyrenesulfonate basis, the same shall apply hereinafter) and 20 parts of water was put into the planetary mixer (ACM-5, manufactured by Aicohsha Co.) to carry out mixing and kneading. Periodical changes in the flow value of the thus obtained solidifying material of the present invention (to be referred to as solidifying material (A) hereinafter) are shown in Table 1. Viscosity of the solidifying material (A) just after kneading was 3,800 cps at a revolution number of 6 rpm, 3,100 cps at a revolution number of 12 rpm and 2,700 cps at a revolution number of 30 rpm (Brookfield type viscometer).

TABLE 1

| Preservation days | Flow value |
| --- | --- |
| just after kneading | 303 mm |
| after 6 days | 328 mm |
| after 14 days | 383 mm |
| after 27 days | 400 mm |
| after 54 days | 410 mm |

A planetary mixer was charged with 484 parts of the solidifying material (A), 790 parts of sodium nitrate and 1 part of sugar and, after kneading, further charged with 30 parts of 25% by weight sodium hydroxide aqueous solution to carry out additional kneading (the sodium nitrate content in the kneaded product, 60.5% by weight). The thus obtained kneaded product showed a flow value of 307 mm. Next, the kneaded product was put into a mold used for compression test and subjected to aging at 90° C. for 24 hours under atmosphere of saturated vapor pressure to obtain a solidified product. The thus obtained solidified product showed a compressive strength of 120.6 kgf/cm$^2$. Results of the examination of water resistance performance of the solidified product showed good water resistance with a weight loss of 6% even after 1 month and with no changes in its external appearance.

Example 2

A planetary mixer was charged with 671.6 parts of the solidifying material (A), 16.65 parts of sodium nitrate and 0.7 part of sugar and, after kneading, further charged with 450 parts of sodium sulfate and 55.5 parts of wollastonite to carry out additional kneading. Next, this was kneaded with 44.44 parts of 25% by weight sodium hydroxide aqueous solution (sodium sulfate content in the kneaded product, 36.3% by weight). The thus obtained kneaded product showed a flow value of 245 mm. Next, the kneaded product was put into a mold used for compression test and subjected to aging at 90° C. for 24 hours under atmosphere of saturated vapor pressure to obtain a solidified product. The thus obtained solidified product showed a compressive strength of 674.7 kgf/cm$^2$. Results of the examination of water resistance performance of the solidified product showed good water resistance with a weight loss of 4% even after 1 month and with no changes in its external appearance.

Example 3

A planetary mixer was charged with 130.6 parts of a granular cation exchange resin (Amberlite IR-102B, manufactured by Organo Co.) and 179.2 parts of a granular anion exchange resin (Amberlite IRA-400, manufactured by Organo Co.). After mixing, this was further mixed with 17 parts of sodium hydroxide and 0.38 part of sugar. Next, 363 parts of the solidifying material (A) was added thereto and kneaded (dried ion exchange resin content in the kneaded product, 19.51% by weight). The thus obtained kneaded product showed a flow value of 245 mm. Next, the kneaded product was put into a mold used for compression test and, after sealing the upper part, subjected to aging at 60° C. for 24 hours under atmosphere of saturated vapor pressure to obtain a solidified product. The thus obtained solidified product showed a compressive strength of 150 kgf/cm$^2$. Results of the examination of water resistance performance of the solidified product showed good water resistance with a weight gain of 1.2% even after 1 month and with no changes in its external appearance.

Example 4

Using a labomixer LV10 (manufactured by Hosokawa Micron Co.), 3,600 parts of granulated blast furnace slag (Esment Super 40P, manufactured by Nippon Steel Co.) having a Blaine specific surface area of 4,000 cm$^2$/g was mixed for 15 minutes with 400 parts of silica fume (manufactured by Japan Metals & Chemicals Co.), and 800 parts of the resulting powder mixture was put into a planetary mixer and kneaded for 5 minutes with an aqueous solution composed of 12 parts of an acrylic acid/maleic acid copolymer (8:2) sodium salt (weight average molecular weight, 25,000), 106 parts of sodium hydroxide, 400 parts of water and 2 parts of sugar, followed by the addition of 562 parts of a cation exchange resin (Powdex PCH, manufactured by Graber Co.) and 324 parts of an anion exchange resin (Powdex PAO, manufactured by Graber Co.) and subsequent 5 minutes of kneading, thereby obtaining a kneaded product. The kneaded product thus obtained had a flow value of 135 mm.

The kneaded product was put into a mold used for compression test and, after sealing the upper part, subjected to aging at 60° C. for 1 day to obtain a solidified product (mixing ratio, 20.1%). The thus obtained solidified product showed a compressive strength of 222 kgf/cm$^2$. Results of the examination of water resistance performance of the solidified product showed good water resistance with a weight gain of 1.5% even after 1 month and with no changes in its external appearance.

Examples 5 to 7

Kneaded products and solidified products were obtained by repeating the process of Example 4 except that the dispersing agent, water and cure stimulating agent were used in respective amounts shown in the column "Composition of kneaded product" of Table 2. Test results of the flow value of the kneaded products and the compressive strength and water resistance of the solidified products are also shown in Table 2.

TABLE 2

| | Example | | |
| --- | --- | --- | --- |
| | 5 | 6 | 7 |
| Composition of kneaded product | | | |
| dispersing agent (parts) | 12 | 12 | 16 |
| water (parts) | 500 | 525 | 780 |
| cure stimulating agent (parts) | 100 | 120 | 140 |
| (mixing ratio (%)) | (19.2) | (18.9) | (19) |
| Physical properties of kneaded product or solidified product | | | |
| flow value (mm) | 165 | 175 | 160 |
| compressive strength (kgf/cm$^2$) | 172 | 200 | 155 |
| water resistance | ○ | ○ | ○ |

Examples 8 to 11

Solidified products of Examples 8 to 11 were obtained in the same manner as described in Examples 4 to 7 except that the aging temperature was changed to room temperature and the aging time was changed to 28 days. Test results of their compressive strength and water resistance are shown in Table 3.

TABLE 3

| | Compressive strength (kgf/cm²) | Water resistance |
| --- | --- | --- |
| Example 8 | 225 | ○ |
| Example 9 | 207 | ○ |
| Example 10 | 210 | ○ |
| Example 11 | 165 | ○ |

Example 12

Using a labomixer LV10, 3,600 parts of granulated blast furnace slag (Esment Super 40P, manufactured by Nippon Steel Co.) having a Blaine specific surface area of 4,000 cm²/g was mixed for 15 minutes with 400 parts of silica fume (manufactured by Japan Metals & Chemicals Co.), and 800 parts of the resulting powder mixture was put into a planetary mixer and kneaded for 5 minutes with an aqueous solution composed of 12 parts of an acrylic acid/maleic acid copolymer (9:1) sodium salt (weight average molecular weight, 25,000), 48 parts of sodium hydroxide, 330 parts of water and 2 parts of sugar, followed by the addition of 466 parts of a cation exchange resin (Powdex PCH, manufactured by Graber Co.) which has been exchanged with Na ions in advance and 334 parts of an anion exchange resin (Powdex PAO, manufactured by Graber Co.) which has been exchanged with sulfuric acid ions in advance and subsequent 5 minutes of kneading, thereby obtaining a kneaded product. The thus obtained kneaded product showed a flow value of 300 mm or more.

The kneaded product was put into a mold used for compression test and, after sealing the upper part, subjected to aging at 60° C. for 1 day to obtain a solidified product (mixing ratio, 18.1%). The thus obtained solidified product showed a compressive strength of 175 kgf/cm². Results of the examination of water resistance performance of the solidified product showed good water resistance with a weight gain of 0.5% even after 1 month and with no changes in its external appearance.

Examples 13 to 15

Kneaded products and solidified products were obtained by repeating the process of Example 12 except that water, the cure stimulating agent and the ion exchange resin were used in respective amounts shown in the column "Composition of kneaded product" of Table 4. Test results of the flow value of the kneaded products and the compressive strength and water resistance of the solidified products are also shown in Table 4. In Table 4, PCH Na and PAO (SO₄) represent a cation exchange resin (Powdex PCH) exchanged with Na ions and an anion exchange resin (Powdex PAO) exchanged with sulfuric acid ions, respectively.

TABLE 4

| | Example | | |
| --- | --- | --- | --- |
| | 13 | 14 | 15 |
| Composition of kneaded product | | | |
| water (parts) | 330 | 315 | 300 |
| cure stimulating agent (parts) | 48 | 49 | 78 |
| PCH Na (parts) | 560 | 560 | 560 |
| PAO (SO₄) (parts) | 415 | 415 | 415 |
| (mixing ratio (%)) | (20.0) | (20.1) | (20.0) |
| Physical properties of kneaded product or solidified product | | | |
| flow value (mm) | 285 | 265 | 205 |
| compressive strength (kgf/cm²) | 184 | 188 | 163 |
| water resistance | ○ | ○ | ○ |

Example 16

Using a labomixer LV10, 3,600 parts of granulated blast furnace slag (Esment Super 40P, manufactured by Nippon Steel Co.) having a Blaine specific surface area of 4,000 cm²/g was mixed for 15 minutes with 400 parts of silica fume (manufactured by Japan Metals & Chemicals Co.), and 800 parts of the resulting powder mixture was put into a planetary mixer and kneaded for 5 minutes with an aqueous solution composed of 12 parts of an acrylic acid/maleic acid copolymer (9:1) sodium salt (weight average molecular weight, 25,000), 61 parts of sodium hydroxide, 365 parts of water, 2 parts of sugar and 87 parts of sodium sulfate, followed by the addition of 563 parts of a cation exchange resin (Powdex PCH) and 325 parts of an anion exchange resin (Powdex PAO) and subsequent 5 minutes of kneading, thereby obtaining a kneaded product. The thus obtained kneaded product showed a flow value of 155 mm.

The kneaded product was put into a mold used for compression test and, after sealing the upper part, subjected to aging at 60° C. for 1 day to obtain a solidified product (mixing ratio, 20.1%). The thus obtained solidified product showed a compressive strength of 344 kgf/cm². Results of the examination of water resistance performance of the solidified product showed good water resistance with a weight gain of 0.4% even after 1 month and with no changes in its external appearance.

Example 17

A kneaded product and a solidified product (mixing ratio, 20.0%) were obtained by repeating the process of Example 16 except that 48 parts of sodium hydroxide, 145 parts of water, 40 parts of sodium sulfate, 368 parts of a cation exchange resin (PCH, manufactured by Organo Co.) and 565 parts of an anion exchange resin (PAO, manufactured by Organo Co.) were used. The thus obtained kneaded product showed a flow value of 126 mm, and the solidified product showed a compressive strength of 206 kgf/cm². Results of the examination of water resistance performance of the solidified product showed good water resistance with a weight gain of 0.4% even after 1 month and with no changes in its external appearance.

Example 18

Using a labomixer LV10, 3,600 parts of granulated blast furnace slag (Esment Super 40P, manufactured by Nippon Steel Co.) having a Blaine specific surface area of 4,000 cm²/g was mixed for 15 minutes with 400 parts of silica fume (manufactured by Japan Metals & Chemicals Co.), and 800 parts of the resulting powder mixture was put into a planetary mixer and kneaded for 5 minutes with an aqueous solution composed of 12 parts of an acrylic acid/maleic acid copolymer (7:3) sodium salt (weight average molecular weight, 35,000), 57.1 parts of sodium hydroxide, 312 parts of water, 2 parts of sugar and 104 parts of sodium nitrate, followed by the addition of 563 parts of a cation exchange resin (Powdex PCH) and 324 parts of an anion exchange resin (Powdex PAO) and subsequent 5 minutes of kneading, thereby obtaining a kneaded product. The thus obtained kneaded product showed a flow value of 195 mm.

The kneaded product was put into a mold used for compression test and, after sealing the upper part, subjected to aging at 60° C. for 1 day to obtain a solidified product (mixing ratio, 20.4%). The thus obtained solidified product showed a compressive strength of 232.1 kgf/cm$^2$. Results of the examination of water resistance performance of the solidified product showed good water resistance with a weight gain of 1.4% even after 1 month and with no changes in its external appearance.

Examples 19 to 24

Kneaded products and solidified products were obtained by repeating the process of Example 18 except that water, the cure stimulating agent, the ion exchange resin and sodium nitrate were used in respective amounts shown in the column "Composition of kneaded product" of Table 5. Test results of the flow value of the kneaded products and the compressive strength and water resistance of the solidified products are also shown in Table 5.

TABLE 5

| Example | 19 | 20 | 21 | 22 | 23 | 24 |
|---|---|---|---|---|---|---|
| Composition of kneaded product | | | | | | |
| water (parts) | 426 | 595 | 349 | 462 | 254 | 269 |
| cure stimulating agent (parts) | 98 | 119 | 46 | 51 | 69 | 73 |
| sodium nitrate (parts) | 82 | 94 | 70 | 104 | 104 | 49 |
| PCH (parts) | 422 | 483 | 361 | 283 | 562 | 562 |
| PAO (parts) | 511 | 584 | 439 | 650 | 325 | 325 |
| (mixing ratio (%)) | (20.0) | (20.1) | (19.3) | (20.0) | (19.8) | (20.0) |
| Physical properties of kneaded product or solidified product | | | | | | |
| flow value (mm) | 200 | 265 | 130 | 155 | 150 | 240 |
| compressive strength (kgf/cm$^2$) | 167 | 137 | 200 | 161 | 226 | 240 |
| water resistance | ○ | ○ | ○ | ○ | ○ | ○ |

Example 25

Using a labomixer LV10, 3,600 parts of granulated blast furnace slag (Esment Super 40P, manufactured by Nippon Steel Co.) having a Blaine specific surface area of 4,000 cm$^2$/g was mixed for 15 minutes with 400 parts of silica fume (manufactured by Japan Metals & Chemicals Co.), and 880 parts of the resulting powder mixture was put into a planetary mixer and kneaded for 5 minutes with an aqueous solution composed of 17.6 parts of an acrylic acid/maleic acid copolymer (6:4) sodium sale (weight average molecular weight, 45,000), 10 parts of sodium hydroxide, 46 parts of water and 1.6 parts of sugar, followed by the addition of 295 parts of a granular cation exchange resin (Amberlite IR-120B) and 368 parts of a granular anion exchange resin (Amberlite IRA-400) and subsequent 5 minutes of kneading, thereby obtaining a kneaded product. The thus obtained kneaded product showed a flow value of 210 mm.

The kneaded product was put into a mold used for compression test and, after sealing the upper part, subjected to aging at 60° C. for 1 day to obtain a solidified product (mixing ratio, 20.7%). The thus obtained solidified product showed a compressive strength of 152 kgf/cm$^2$. Results of the examination of water resistance performance of the solidified product showed good water resistance with no changes in its external appearance even after 1 month.

Example 26

A kneaded product and a solidified product were obtained by repeating the process of Example 25 except that 152 parts of water, 9.5 parts of the cure stimulating agent, 249 parts of the granular cation exchange resin (Amberlite IR-120B) and 319 parts of the granular anion exchange resin (Amberlite IRA-400) were used. The thus obtained kneaded product showed a flow value of 260 mm, and the solidified product showed a compressive strength of 150 kgf/cm$^2$ and good water resistance with no changes in its external appearance even after 1 week.

Example 27

Using a labomixer LV10, 3,600 parts of granulated blast furnace slag (Esment Super 40P, manufactured by Nippon Steel Co.) having a Blaine specific surface area of 4,000 cm$^2$/g was mixed for 15 minutes with 400 parts of silica fume (manufactured by Japan Metals & Chemicals Co.), and 880 parts of the resulting powder mixture was put into a planetary mixer and kneaded for 5 minutes with an aqueous solution composed of 17.6 parts of an acrylic acid/maleic acid copolymer (9:1) sodium salt (weight average molecular weight, 25,000), 12.3 parts of sodium hydroxide, 183 parts of water and 1.8 parts of sugar, followed by the addition of 300 parts of a granular cation exchange resin (Amberlite IR-120B) and 473 parts of a granular anion exchange resin (Amberlite IRA-400) and subsequent 5 minutes of kneading, thereby obtaining a kneaded product. The thus obtained kneaded product showed a flow value of 180 mm.

The kneaded product was put into a mold used for compression test and, after sealing the upper part, subjected to aging at 60° C. for 1 day to obtain a solidified product (mixing ratio, 19.3%). The thus obtained solidified product showed a compressive strength of 210 kgf/cm². Results of the examination of water resistance performance of the solidified product showed good water resistance with no changes in its external appearance even after 1 month.

Example 28

Using an omni mixer, 720 parts of granulated blast furnace slag (Esment Super 30P, manufactured by Nippon Steel Co.) having a Blaine specific surface area of 3,000 cm²/g was mixed with 80 parts of silica fume (manufactured by Japan Metals & Chemicals Co.), and the resulting mixture was kneaded for 5 minutes with an aqueous solution composed of 10 parts of an acrylic acid/maleic acid copolymer (7:3) sodium salt (weight average molecular weight, 35,000), 24 parts of sodium hydroxide as a cure stimulating agent, 240 parts of water and 1 part of sugar. This was further stirred and kneaded for 10 minutes with 460 parts of sodium nitrate.

The thus obtained kneaded product showed a flow value of 300 mm. Next, the kneaded product was put into a mold used for compression test and subjected to steam aging at 60° C. for 1 day under atmosphere of saturated vapor pressure to obtain a solidified product having a compressive strength of 250 kgf/cm². Results of the examination of water resistance performance of the solidified product showed good water resistance with a weight loss of 3.5% even after 1 month and with no changes in its external appearance.

Example 29

Using an omni mixer, 750 parts of granulated blast furnace slag (Esment Super 40P, manufactured by Nippon Steel Co.) having a Blaine specific surface area of 4,000 cm²/g was mixed with 50 parts of silica fume (manufactured by Japan Metals & Chemicals Co.), and the resulting mixture was kneaded for 5 minutes with an aqueous solution composed of 12 parts of an acrylic acid/maleic acid copolymer (9:1) sodium salt (weight average molecular weight, 25,000), 40 parts of sodium hydroxide, 250 parts of water and 1 part of sugar. This was further stirred and kneaded for 10 minutes with 1,103 parts of sodium nitrate. The thus obtained kneaded product showed a flow value of 295 mm.

Next, the kneaded product was put into a mold used for compression test and subjected to steam aging at 60° C. for 1 day under atmosphere of saturated vapor pressure to obtain a solidified product having a compressive strength of 395 kgf/cm². Results of the examination of water resistance performance of the solidified product showed good water resistance with a weight loss of 9.3% even after 1 month and with no changes in its external appearance.

Example 30

Using an omni mixer, 650 parts of granulated blast furnace slag (Esment Super 60P, manufactured by Nippon Steel Co.) having a Blaine specific surface area of 6,000 cm²/g was mixed for 60 seconds with 100 parts of silica fume (manufactured by Japan Metals & Chemicals Co.) and 50 parts of fly ash, and the resulting mixture was kneaded for 5 minutes with an aqueous solution composed of 15 parts of sodium polyacrylate (weight average molecular weight, 40,000), 56 parts of sodium hydroxide, 400 parts of water and 1 part of sugar. This was further kneaded for 15 minutes with 848 parts of sodium nitrate. The thus obtained kneaded product showed a flow value of 300 mm or more.

Next, the kneaded product was put into a mold used for compression test and subjected to steam aging at 60° C. for 1 day under atmosphere of saturated vapor pressure to obtain a solidified product having a compressive strength of 280 kgf/cm². Results of the examination of water resistance performance of the solidified product showed good water resistance with a weight loss of 4.4% even after 1 week and with no changes in its external appearance.

Example 31

Using a concrete mixer, 720 parts of granulated blast furnace slag (Esment Super 30P, manufactured by Nippon Steel Co.) having a Blaine specific surface area of 3,000 cm²/g was mixed for 90 seconds with 80 parts of silica fume (manufactured by Japan Metals & Chemicals Co.) and 461 parts of anhydrous sodium sulfate. This was then kneaded for 5 minutes with an aqueous solution composed of 10 parts of sodium polyacrylate (weight average molecular weight, 25,000), 24 parts of sodium hydroxide, 240 parts of water and 2 parts of sugar.

The thus obtained kneaded product showed a flow value of 300 mm. Next, the kneaded product was put into a mold used for compression test and subjected to steam aging at 60° C. for 1 day under atmosphere of saturated vapor pressure to obtain a solidified product having a compressive strength of 550 kgf/cm². Results of the examination of water resistance performance of the solidified product showed good water resistance with a weight loss of 2.5% even after 1 month and with no changes in its external appearance.

Example 32

Using a planetary mixer, 750 parts of granulated blast furnace slag (Esment Super 40P, manufactured by Nippon Steel Co.) having a Blaine specific surface area of 4,000 cm²/g was mixed with 50 parts of silica fume (manufactured by Japan Metals & Chemicals Co.), and the resulting mixture was kneaded for 5 minutes with an aqueous solution composed of 12 parts of an acrylic acid/maleic acid copolymer (9:1) sodium salt (weight average molecular weight, 35,000), 40 parts of sodium hydroxide, 250 parts of water and 2 parts of sugar. This was further kneaded with 1,104 parts of anhydrous sodium sulfate for 5 minutes. The thus obtained kneaded product showed a flow value of 250 mm.

Next, the kneaded product was put into a mold used for compression test and subjected to steam aging at 60° C. for 1 day under atmosphere of saturated vapor pressure to obtain a solidified product having a compressive strength of 380 kgf/cm². Results of the examination of water resistance performance of the solidified product showed good water resistance with a weight loss of 7.5% even after 1 month and with no changes in its external appearance.

Example 33

Using an omni mixer, 800 parts of granulated blast furnace slag (Esment Super 60P, manufactured by Nippon Steel Co.) having a Blaine specific surface area of 6,000 cm²/g was mixed for 1 minute with 100 parts of silica fume (manufactured by Japan Metals & Chemicals Co.) and 100 parts of fly ash to obtain a powdery composition. Separately from this, 15 parts of an acrylic acid/maleic acid copolymer (8:2) sodium salt (weight average molecular weight, 32,000), 0.2 part of polyacrylamide (weight average molecular weight, 2,500,000) as a thickener, 56 parts of sodium hydroxide and 2 parts of sugar were dissolved in 1,610 parts of 50% by weight sodium sulfate waste water as a radioactive waste, and the resulting solution was mixed and kneaded for 5 minutes with the powdery composition prepared above. The thus obtained kneaded product showed a flow value of 300 mm or more.

Next, the kneaded product was put into a mold used for compression test and subjected to steam aging at 60° C. for 1 day under atmosphere of saturated vapor pressure to obtain a solidified product having a compressive strength of 250 kgf/cm². Results of the examination of water resistance performance of the solidified product showed good water resistance with a weight loss of 4.5% even after 1 month and with no changes in its external appearance.

Example 34

Using a concrete mixer, 720 parts of granulated blast furnace slag (Esment Super 30P, manufactured by Nippon Steel Co.) having a Blaine specific surface area of 3,000 cm²/g was mixed for 90 seconds with 40 parts of silica fume (manufactured by Japan Metals & Chemicals Co.), 40 parts of sepiolite and 460 parts of anhydrous sodium sulfate. This was further kneaded for 5 minutes with an aqueous solution composed of 10 parts of sodium polyacrylate (weight average molecular weight, 25,000), 24 parts of sodium hydroxide, 240 parts of water and 2 parts of sugar.

The thus obtained kneaded product showed a flow value of 300 mm. Next, the kneaded product was put into a mold used for compression test and subjected to steam aging at 60° C. for 1 day under atmosphere of saturated vapor pressure to obtain a solidified product having a compressive strength of 550 kgf/cm². Results of the examination of water resistance performance of the solidified product showed sufficient water resistance with a weight loss of 2.5% even after 1 month and with no changes in its external appearance.

Example 35

Using a planetary mixer, 750 parts of granulated blast furnace slag (Esment Super 40P, manufactured by Nippon Steel Co.) having a Blaine specific surface area of 4,000 cm²/g was mixed for 90 seconds with 50 parts of silica fume (manufactured by Japan Metals & Chemicals Co.), 80 parts of wollastonite and 1,184 parts of anhydrous sodium sulfate. Next, this was further kneaded for 5 minutes with an aqueous solution composed of 12 parts of an acrylic acid/ maleic acid copolymer (9:1) sodium salt (weight average molecular weight, 35,000), 40 parts of sodium hydroxide, 250 parts of water and 2 parts of sugar. The thus obtained kneaded product showed a flow value of 250 mm.

Next, the kneaded product was put into a mold used for compression test and subjected to steam aging at 60° C. for 1 day under atmosphere of saturated vapor pressure to obtain a solidified product having a compressive strength of 350 kgf/cm². Results of the examination of water resistance performance of the solidified product showed sufficient water resistance with a weight loss of 3.5% even after 1 month and with no changes in its external appearance.

Example 36

Using an omni mixer, 800 parts of granulated blast furnace slag (Esment Super 80P, manufactured by Nippon Steel Co.) having a Blaine specific surface area of 8,000 cm²/g was mixed for minute with 100 parts of silica fume (manufactured by Japan Metals & Chemicals Co.) and 100 parts of sepiolite to obtain a powdery composition. Separately from this, 15 parts of an acrylic acid/maleic acid copolymer (8:2) sodium salt (weight average molecular weight, 32,000), 0.2 part of polyacrylamide (weight average molecular weight, 2,500,000) as a thickener, 56 parts of sodium hydroxide and 2 parts of sugar were dissolved in 1,610 parts of 50% by weight sodium sulfate waste water as a radioactive waste, and the resulting solution was kneaded for 5 minutes with the powdery composition prepared above. The thus obtained kneaded product showed a flow value of 300 mm or more.

Next, the kneaded product was put into a mold used for compression test and subjected to steam aging at 60° C. for 1 day under atmosphere of saturated vapor pressure to obtain a solidified product having a compressive strength of 250 kgf/cm². Results of the examination of water resistance performance of the solidified product showed sufficient water resistance with a weight loss of 4.5% even after 1 month and with no changes in its external appearance.

Example 37

Using an omni mixer, 720 parts of granulated blast furnace slag (Esment Super 30P, manufactured by Nippon Steel Co.) having a Blaine specific surface area of 3,000 cm²/g was mixed with 40 parts of silica fume (manufactured by Japan Metals & Chemicals Co.) and 40 parts of sepiolite and then kneaded for 5 minutes with an aqueous solution composed of 10 parts of an acrylic acid/maleic acid copolymer (8:2) sodium salt (weight average molecular weight, 35,000), 24 parts of sodium hydroxide, 240 parts of water and 1 part of sugar. This was further kneaded for 10 minutes with 460 parts of sodium nitrate.

The thus obtained kneaded product showed a flow value of 300 mm. Next, the kneaded product was put into a mold used for compression test and subjected to steam aging at 60° C. for 1 day under atmosphere of saturated vapor pressure to obtain a solidified product having a compressive strength of 370 kgf/cm².

Results of the examination of water resistance performance of the solidified product showed sufficient water resistance with a weight loss of 4.5% even after 1 month and with no changes in its external appearance.

Example 38

Using an omni mixer, 750 parts of granulated blast furnace slag (Esment Super 40P, manufactured by Nippon Steel Co.) having a Blaine specific surface area of 4,000 cm²/g was mixed with 50 parts of silica fume (manufactured by Japan Metals & Chemicals Co.) and 100 parts of wollastonite (manufactured by Nyco Co.) and then kneaded for 5 minutes with an aqueous solution composed of 12 parts of an acrylic acid/maleic acid copolymer (9:1) sodium salt (weight average molecular weight, 25,000), 40 parts of sodium hydroxide, 250 parts of water and 2 parts of sugar. This was further stirred and mixed with 803 parts of sodium nitrate. The thus obtained kneaded product showed a flow value of 280 mm.

Next, the kneaded product was put into a mold used for compression test and subjected to steam aging at 60° C. for 1 day under atmosphere of saturated vapor pressure to obtain a solidified product having a compressive strength of 330 kgf/cm². Results of the examination of water resistance performance of the solidified product showed sufficient water resistance with a weight loss of 6.3% even after 1 month and with no changes in its external appearance.

Example 39

Using an omni mixer, 800 parts of granulated blast furnace slag (Esment Super 60P, manufactured by Nippon Steel Co.) having a Blaine specific surface area of 6,000 cm²/g was mixed for 60 seconds with 100 parts of silica fume (manufactured by Japan Metals & Chemicals Co.) and 50 parts of amosite, and the resulting mixture was kneaded for 5 minutes with a slurry mixture composed of 15 parts of an acrylic acid/maleic acid copolymer (9:1) sodium salt (weight average molecular weight, 40,000), 56 parts of sodium hydroxide, 500 parts of water and 1 part of sugar. This was further kneaded for 15 minutes with 1,572 parts of sodium nitrate. The thus obtained kneaded product showed a flow value of 300 mm or more.

Next, the kneaded product was put into a mold used for compression test and subjected to steam aging at 60° C. for 1 day under atmosphere of saturated vapor pressure to obtain a solidified product having a compressive strength of 250 kgf/cm². Results of the examination of water resistance performance of the solidified product showed sufficient water resistance with a weight loss of 8.5% even after 1 week and with no changes in its external appearance.

Example 40

Using a planetary mixer, 206 parts of a cation exchange resin (Powder PCH) and 140 parts of an anion exchange resin (Powdex PAO) were kneaded, while cooling, for 20 minutes with an aqueous solution composed of 24 parts of sodium hydroxide, 4.8 parts of an acrylic acid/maleic acid copolymer (9:1) sodium salt ((weight average molecular weight, 2,500), 4.2 parts of a dispersant used for cement (sodium salt of a copolymer composed of 2-methylbutene-1, maleic anhydride and ligninsulfonic acid; WORK500S, manufactured by Nippon Zeon Co.) and 63.5 parts of water, and the resulting mixture was further kneaded for 10 minutes with 180 parts of granulated blast furnace slag (Esment Super 100P, manufactured by Nippon Steel Co.) having a Blaine specific surface area of 10,000 cm²/g, 20 parts of silica fume (manufactured by Ezyptian Ferro Alloys Company), 15 parts of sodium nitrate and 2 parts of an antifoaming agent (Defoamer 14HP, manufactured by San Nopco Co.). The thus obtained kneaded product showed a flow value of 300 mm or more. Next, the thus obtained kneaded product was put into a mold used for compression test and subjected to steam aging at 60° C. for 1 day under atmosphere of saturated vapor pressure to obtain a solidified product having a compressive strength of 80 kgf/cm². Results of the examination of water resistance performance of the solidified product showed sufficient water resistance even after 3 months with a weight gain of 1.6% and a volume gain of 0.5%, and with no changes in its external appearance.

Examples 41 to 43

Kneaded products and solidified products were obtained by repeating the process of Example 40 except that the granulated blast furnace slag and silica fume were used in respective amounts shown in the column "Composition of kneaded product" of Table 6. Test results of the flow value of the kneaded products and the compressive strength and water resistance of the solidified products (after 3 months) are also shown in Table 6.

TABLE 6

| | Example | | |
|---|---|---|---|
| | 41 | 42 | 43 |
| Composition of kneaded product | | | |
| blast furnace slag (parts) | 150 | 163.6 | 189.5 |
| silica fume (parts) | 50 | 36.4 | 10.5 |
| (mixing ratio (%)) | (20.0) | (20.1) | (20.0) |
| Physical properties of kneaded product or solidified product | | | |
| flow value (mm) | 300 or more | 300 or more | 300 or more |
| compressive strength (kgf/cm²) | 115 | 105 | 76 |
| water resistance | | | |
| weight gain (%) | 1.2 | 1.4 | 1.8 |
| volume gain (%) | 0.4 | 0.4 | 0.6 |
| external appearance | ○ | ○ | ○ |

Examples 44 to 47

Respective solidified products were obtained in the same manner as described in Examples 40 to 43 except that the aging temperature was changed to room temperature and the aging time was changed to 28 days. Test results of the the compressive strength and water resistance of the solidified products (after 3 months) are shown in Table 7.

TABLE 7

| | Example | | | |
|---|---|---|---|---|
| | 44 | 45 | 46 | 47 |
| Compressive strength (kgf/cm²) | 120 | 145 | 135 | 135 |
| Water resistance | | | | |
| weight gain (%) | 3.3 | 2.4 | 2.9 | 3.5 |
| volume gain (%) | 0.8 | 0.5 | 0.5 | 0.7 |
| external appearance | ○ | ○ | ○ | |

Examples 48 to 54

Kneaded products and solidified products were obtained by repeating the process of Example 40, except that types and amounts of waste and amounts of granulated blast furnace slag, silica fume, antifoaming agent, dispersants, sodium hydroxide and water were changed as shown in the column "Composition of kneaded product" of Table 8, and that wollastonite as a needle mineral powder, sodium nitrate as a fluidizing agent and sugar as a cure delaying agent were used in respective amounts shown in the column "Composition of kneaded product" of Table 8. In this case, the aging temperature and time for the preparation of solidified products were changed as shown in the column "Solidification condition" of Table 8. Test results of the flow value of the kneaded products and the compressive strength and water resistance of the solidified products (after 3 months) are also shown in Table 8.

TABLE 8

| Example | 48 | 49 | 50 | 51 | 52 | 53 | 54 |
|---|---|---|---|---|---|---|---|
| Composition of kneaded product | | | | | | | |
| type of waste | A | B | C | D | E | F | G |
| amount of waste (parts) | 310 | 535 | 1158 | 240 | 1250 | 700 | 400 |

TABLE 8-continued

| Example | 48 | 49 | 50 | 51 | 52 | 53 | 54 |
|---|---|---|---|---|---|---|---|
| blast furnace slag (parts) | 270 | 720 | 720 | 221.2 | 824 | 327.3 | 279 |
| silica fume (parts) | 30 | 80 | 80 | 24.6 | 91.5 | 36.4 | 31.0 |
| wollastonite (parts) | 0 | 80 | 0 | 24.6 | 91.5 | 36.4 | 0 |
| Na nitrate (parts) | 9 | 24 | 0 | 0 | 0 | 0 | 0 |
| antifoaming agent (parts) | 0.6 | 1.6 | 0 | 0 | 0 | 0 | 0 |
| dispersant-1 (parts) | 6 | 16 | 12 | 10.8 | 37.8 | 15 | 4.3 |
| dispersant-2 (parts) | 1 | 2.8 | 0 | 0 | 0 | 0 | 0 |
| Na hydroxide (parts) | 16.3 | 24 | 32 | 5.4 | 352.5 | 193 | 10.1 |
| sugar (parts) | 0.38 | 1 | 1.6 | 0 | 0 | 0 | 0 |
| water (parts) | 32 | 308 | 304 | 53.5 | 616.9 | 692.5 | 370 |
| Physical property of kneaded product flow value (mm) | 245 | 260 | 320 | 300 ↑ | 300 ↑ | 248 | 218 |
| Solidification condition |  |  |  |  |  |  |  |
| temperature (°C.) | 60 | 60 | 90 | 60 | 60 | 60 | 60 |
| time (day) | 1 | 1 | 1 | 1 | 1 | 1 | 1 |
| Physical property of solidified product |  |  |  |  |  |  |  |
| compressive strength (kgf/cm$^2$) | 140 | 660 | 210 | 700 | 90 | 120 | 115 |
| water resistance | ○ | ○ | ○ | ○ | ○ | ○ |  |

The following wastes were used in the above table:

A, 1:1 (weight ratio) mixture of a cation exchange resin (Amberlite IR-120B) and an anion exchange resin (Amberlite IRA-400);

B, sodium sulfate;

C, sodium nitrate;

D, miscellaneous solid composed of metal pipe and steel product;

E, sodium borate;

F, simulated ash having an actually burned ash composition; and

G, calcium phosphate.

The following dispersants were used in the above table:

dispersant-1, sodium salt of an acrylic acid/maleic acid copolymer (9:1); and dispersant-2, WORK500 (sodium salt of 2-methylbutene-1/maleic anhydride copolymer, manufactured by Nippon Zeon Co.).

In the above table, the expression "300 ↑" as used in the column of flow value means that the flow value is 300 mm or more.

Examples 55 and 56

Kneaded products and solidified products were obtained by repeating the process of Example 1, except that types and amounts of wastes, granulated blast furnace slag and dispersants and the amounts of sodium hydroxide and water were changed as shown in the column "Composition of kneaded product" of Table 9, and that wollastonite as a needle mineral powder, sodium nitrate as a fluidizing agent and sugar as a cure delaying agent were used in respective amounts shown in the column "Composition of kneaded product" of Table 9. Test results of the flow value of the kneaded products and the compressive strength and water resistance of the solidified products (after 3 months) are also shown in Table 9. In this instance, the terms "dispersant-1" and "dispersant-2" are the same compounds as in Table 8.

TABLE 9

| | Example | |
|---|---|---|
| | 55 | 56 |
| Composition of kneaded product | | |
| type of waste | H | I |
| amount of waste (parts) | 125 | 200 |
| blast furnace slag-1 (parts) | 90 | 90 |
| blast furnace slag-2 (parts) | 0 | 10 |
| wollastonite (parts) | 10 | 10 |
| sodium nitrate (parts) | 3 | 3 |
| dispersant-1 (parts) | 2 | 3 |
| dispersant-2 (parts) | 0.35 | 0.35 |
| sodium hydroxide (parts) | 10 | 9 |
| sugar (parts) | 0.125 | 0.125 |
| water (parts) | 70 | 140 |
| Physical property of kneaded product flow value (mm) | 260 | 280 |
| Physical property of solidified product | | |
| compressive strength (kgf/cm$^2$) | 150 | 180 |
| water resistance | ○ | ○ |

The following wastes were used in the above table: H, sodium borate; and I, calcium phosphate.

The following granulated blast furnace slag samples were used in the above table: blast furnace slag-1, Esment Super 60P manufactured by Nippon Steel Co.(Blaine specific surface area, 6,000 cm$^2$/g); and blast furnace slag-2, Esment Super 100P manufactured by Nippon Steel Co.(Blaine specific surface area, 10,000 cm$^2$/g).

Example 57

Using a planetary mixer, 206 parts of a cation exchange resin (Powder PCH) and 140 parts of an anion exchange resin (Powdex PAO) were kneaded, while cooling, for 20 minutes with an aqueous solution composed of 24 parts of sodium hydroxide, 4.8 parts of an acrylic acid/maleic acid copolymer (9:1) sodium salt (weight average molecular weight, 2,500), 4.2 parts of a dispersant used for cement (WORK500S, manufactured by Nippon Zeon Co.) and 65 parts of water, and the resulting mixture was further kneaded for 10 minutes with 180 parts of granulated blast furnace slag (Esment Super 100P, manufactured by Nippon Steel Co.) having a Blaine specific surface area of 10,000 cm$^2$/g, 20 parts of silica fume (manufactured by Ezyptian Ferro Alloys Company), 9.3 parts of calcium hydroxide, 15 parts of sodium nitrate and 2 parts of an antifoaming agent (Defoamer 14HP, manufactured by San Nopco Co.). The thus obtained kneaded product showed a flow value of 290 mm and more. Next, the kneaded product was put into a mold used for compression test and subjected to steam aging at 60° C. for 1 day under atmosphere of saturated vapor pressure to obtain a solidified product having a compressive strength of 75 kgf/cm$^2$. Results of the examination of water resistance performance of the solidified product showed sufficient water resistance even after 3 months with a weight gain of 1.5% and a volume gain of 0.5%, and with no changes in its external appearance.

[Effect of the Invention]

The solidifying material of the present invention can solidify radioactive waste in a large quantity, and the resulting solidified product shows excellent properties such as high strength and sufficient water resistance.

What is claimed is:

1. A solidifying material used for radioactive waste which comprises (a) granulated blast furnace slag and/or converter slag, (b) an ultra-fine powder substance, (c) a dispersing agent and (d) a needle mineral powder.

2. The solidifying material according to claim 1 wherein the component (a) has a Blaine specific surface area of 2,000 to 15,000 cm$^2$/g.

3. The solidifying material according to claim 1 further comprising (d) a fibrous substance.

4. The solidifying material according to claim 1 or 3 wherein the component (c) is a polymer having carboxylate groups in the molecule and/or a salt thereof.

5. The solidifying material according to claim 1 or 3 further comprising one substance selected from the group consisting of (e) a water soluble nitric acid salt, (f) a thickener and (g) water.

6. The solidifying material according to claim 5 wherein viscosity just after kneading is in the range of from 500 to 30,000 cps.

7. A process for solidifying radioactive wastes which comprises mixing and kneading a solidifying material selected from the group consisting of materials comprising (a) granulated blast furnace slag and/or converter slag, (b) an ultra-fine powder substance and (c) a dispersing agent or comprising (a) granulated blast furnace slag and/or converter slag, (b) an ultra-fine powder substance, (c) a dispersing agent and (d) a needle mineral powder, with (h) a cure stimulating agent and radioactive waste, and subsequently effecting aging and solidification thereof.

8. A process for solidifying radioactive wastes which comprises mixing and kneading the solidifying material of claim 5 with (h) a cure stimulating agent and radioactive waste, and subsequently effecting aging and solidification thereof.

9. A process for solidifying radioactive wastes which comprises mixing and kneading the solidifying material of claim 5 with (h) a cure stimulating agent, radioactive waste and water, and subsequently effecting aging and solidification thereof.

10. The process according to claim 8 wherein the radioactive waste is one material selected from the group consisting of the following (1) to (6):

(1) waste water discharged from BWR electric power plants which contains inorganic salts including sodium sulfate, or a powder obtained as occasion demands by its heat drying and subsequent pulverization, (2) waste water discharged from PWR electric power plants which contains inorganic salts including borate, a powder obtained as occasion demands by its heat drying and subsequent pulverization, a cake obtained by pretreating the borate-containing waste water, or a powder obtained as occasion demands by heat drying and subsequent pulverization of the cake, (3) a granular or powdery ion exchange resin discharged from nuclear power plants, (4) burned ash formed after combustion of combustible waste discharged from nuclear power plants, (5) waste water discharged from spent nuclear fuel reprocessing plants or facilities which contains inorganic salts including sodium nitrate and/or calcium phosphate, or a powder obtained as occasion demands by its heat drying and subsequent pulverization, and (6) burned ash formed after combustion of combustible waste discharged from spent nuclear fuel reprocessing plants or facilities.

11. A process for solidifying radioactive wastes which comprises mixing and kneading the solidifying material of claim 7 with (h) a cure stimulating agent, radioactive waste and water, and subsequently effecting aging and solidification thereof.

12. The process according to claim 7 wherein the radioactive waste is one material selected from the group consisting of the following (1) to (6):

(1) waste water discharged from BWR electric power plants which contains inorganic salts including sodium sulfate, or a powder obtained on occasion demands by its heat drying and subsequent pulverization, (2) waste water discharged from PWR electric power plants which contains inorganic salts including borate, a powder obtained as occasion demands by its heat drying and subsequent pulverization, a cake obtained by pretreating the borate-containing waste water, or a powder obtained as occasion demands by heat drying and subsequent pulverization of the cake, (3) a granular or powdery ion exchange resin discharged from nuclear power plants, (4) burned ash formed after combustion of combustible waste discharged from nuclear power plants, (5) waste water discharged from spent nuclear fuel reprocessing plants or facilities which contains inorganic salts including sodium nitrate and/or calcium phosphate, or a powder obtained as occasion demands by its heat drying and subsequent pulverization, and (6) burned ash formed after combustion of combustible waste discharged from spent nuclear fuel reprocessing plants or facilities.

13. A process for solidifying radioactive wastes which comprises the steps of:

putting a radioactive miscellaneous solid waste selected from the group consisting of (7) miscellaneous solid waste discharged from nuclear power plants and (8) miscellaneous solid waste discharged from spent nuclear fuel reprocessing plants or facilities in a container, packing the container with a mixture composed of the solidifying material of claim 7 and (h) a cure stimulating agent and (to be referred to as mixture (A1) hereinafter) with vibration as occasion demands, and subsequently effecting aging and solidification thereof at room temperature or with heating.

14. The process according to claim 12 wherein aging and solidification are effected at room temperature or with heating after mixing the radioactive waste of claim 12 in the form of powder with said mixture (A1) or (A3) and if necessary adding water thereto.

15. The process according to claim 12 wherein aging and solidification are effected at room temperature or with heating after mixing and kneading the radioactive waste of claim 12 in the form of waste water with said mixture (A1) or (A3) or after increasing concentration of solid contents in the waste water and subsequently mixing and kneading with the mixture (A1) or (A3).

16. The process according to any one of claims 12 wherein the radioactive waste is mixed or kneaded with the mixture (A1), (A2) or (A3) and then aging and solidification are effected at room temperature as such or after covering it to prevent evaporation of water.

17. A process for solidifying radioactive wastes which comprises the steps of:

putting a radioactive miscellaneous solid waste selected from the group consisting of (7) miscellaneous solid waste discharged from nuclear power plants and (8) miscellaneous solid waste discharged from spent nuclear fuel reprocessing plants or facilities in a container, packing the container with a mixture composed of the solidifying material of claim 7, (h) a cure stimulating agent and water (to be referred to as mixture (A2) hereinafter) with vibration as occasion demands, and subsequently effecting aging and solidification thereof at room temperature or with heating.

18. A process for solidifying radioactive wastes which comprises the steps of:

putting a radioactive miscellaneous solid waste selected from the group consisting of (7) miscellaneous solid waste discharged from nuclear power plants and (8) miscellaneous solid waste discharged from spent nuclear fuel reprocessing plants or facilities in a container, packing the container with a mixture composed of the solidifying material of claim 5 and (h) a cure stimulating agent (to be referred to as mixture (A3) hereinafter) with vibration as occasion demands, and subsequently effecting aging and solidification thereof at room temperature or with heating.

19. A process for solidifying radioactive wastes which comprises the steps of:

putting a radioactive miscellaneous solid waste selected from the group consisting of (7) miscellaneous solid waste discharged from nuclear power plants and (8) miscellaneous solid waste discharged from spent nuclear fuel reprocessing plants or facilities in a container, packing the container with a mixture composed of the solidifying material of claim 5, (h) a cure stimulating agent and water (to be referred to as mixture (A4) hereinafter) with vibration as occasion demands, and subsequently effecting aging and solidification thereof at room temperature or with heating.

20. The process according to claim 13 wherein aging and solidification are effected at room temperature or with heating after mixing the radioactive waste of claim 13 in the form of powder with said mixture (A1) and if necessary adding water thereto.

21. The process according to claim 13 wherein the radioactive waste is mixed or kneaded with the mixture (A1) and then aging and solidification are effected at room temperature as such or after covering it to prevent evaporation of water.

22. The process according to claim 15 wherein the radioactive waste is mixed or kneaded with the mixture (A1) or (A3) and then aging and solidification are effected at room temperature as such or after covering it to prevent evaporation of water.

23. The process according to claim 10 wherein aging and solidification are effected at room temperature or with heating after mixing the radioactive waste of claim 10 in the form of powder with said mixture (A1) or (A3) and if necessary adding water thereto.

24. The process according to claim 10 wherein aging and solidification are effected at room temperature or with heating after mixing and kneading the radioactive waste of claim 10 in the form of waste water with said mixture (A1) or (A3) or after increasing concentration of solid contents in the waste water and subsequently mixing and kneading with the mixture (A1) or (A3).

25. The process according to claim 10 wherein the radioactive waste is mixed or kneaded with the mixture (A1), (A2) or (A3) and then aging and solidification are effected at room temperature as such or after covering it to prevent evaporation of water.

26. The process according to claim 18 wherein the radioactive waste is mixed or kneaded with the mixture (A1), (A2) or (A3) and then aging and solidification are effected at room temperature as such or after covering it to prevent evaporation of water.

27. The process according to claim 19 wherein the radioactive waste is mixed or kneaded with the mixture (A1), (A2) or (A3) and then aging and solidification are effected at room temperature as such or after covering it to prevent evaporation of water.

* * * * *

UNITED STATES PATENT AND TRADEMARK OFFICE
CERTIFICATE OF CORRECTION

PATENT NO.   :   5,732,363
DATED        :   March 24, 1998
INVENTOR(S)  :   Kazunori Suzuki, et al.

It is certified that error appears in the above-identified patent and that said Letters Patent is hereby corrected as shown below:

On the title page, insert the following:
   [30]     Foreign Application Priority Data Oct. 27, 1994     [JP]    Japan       6-264248
   Oct. 27, 1994     [JP]    Japan       6-264259
   Oct. 18, 1995     [JP]    Japan       7-270171

Signed and Sealed this

Eighteenth Day of August, 1998

Attest:

BRUCE LEHMAN

*Attesting Officer*            *Commissioner of Patents and Trademarks*